Oct. 15, 1957            W. KEILIG            2,809,741

EDGE-WISE CONVEYOR SYSTEM

Filed Oct. 21, 1953            2 Sheets-Sheet 1

INVENTOR
W. KEILIG
BY
ATTORNEY

Oct. 15, 1957 W. KEILIG 2,809,741
EDGE-WISE CONVEYOR SYSTEM
Filed Oct. 21, 1953 2 Sheets-Sheet 2

INVENTOR
W. KEILIG
BY
Robert Harding Jr.
ATTORNEY

United States Patent Office 2,809,741
Patented Oct. 15, 1957

2,809,741

EDGE-WISE CONVEYOR SYSTEM

Wolfgang Keilig, Berlin-Neukolln, Germany, assignor to International Standard Electric Corporation, New York, N. Y., a corporation of Delaware Application October 21, 1953, Serial No. 387,353

Claims priority, application Germany October 22, 1952

5 Claims. (Cl. 198—185)

The present invention relates to an edgewise conveyor system in which the dispatch articles are brought into another conveying direction by means of switches which are arranged alongside the conveying path. In conventional types of conveyor systems these switches consist of switch tongues being controlled manually or electromagnetically. When actuated, these switch tongues project into the conveying channel so that the dispatch article which is just being conveyed, will meet against them and will be thus conducted into the direction determined by the position of the switch tongues. In most cases collecting containers are provided directly behind such switches into which the dispatched articles, from the conveying channel, are collected. However, another possibility is that the dispatched articles are directed from one conveying channel onto another one, being redirected from the first channel in a way enabling its further conveyance in the second channel.

The application of switch tongues projecting into the conveying channel, however, is difficult in those cases in which only selected dispatch articles are to be guided into the collecting container. In these cases there is likely to occur a jamming and as a result of which the articles are easily piled up. Furthermore, the conventional types of solutions have the disadvantage that the changing over of the articles to be conveyed from one conveying channel into another one may not be performed properly as the pushing forces of the conveyor belt acting upon the dispatch articles is normally rather slight.

The present invention avoids the above-mentioned deficiencies. This is attained in that the switch comprises two edge-wise rotating belts which seize the dispatched articles. These belts are swivelled by means of a lever mechanism out of their resting position into the launching direction. This swivel motion may be performed to either side of the conveying section.

According to the further embodiment two rollers are arranged vertically on both sides of the conveyor belt. To the axes of these rollers are pivoted swinging arms, each carrying a roller on its one end. An endless belt is led over the pair of rollers associated with the swinging arms. The ends of the swinging arms are normally directed in the direction of travel of the conveyor belt but may be pivoted to change the direction of travel of an article.

In accordance with another feature of the invention the return belt of the conveyor belt is used for driving the two belts. The pair of endless belts are positioned at one end of the rollers and the other ends of these rollers are driven by means of the return belt.

Further, the return belt is so guided over the rollers that the adjacent surfaces of the endless belts travel in the same direction.

Another feature of the invention provides a system of levers attached to the arms at the axes of the rollers. These levers are adjustable and are coupled to each other by means of a tension spring. One of the levers extends beyond the axle providing an arm, by means of which the turning of the axes is accomplished in connection with the levers and the tension spring. By the employment of such a swivelling device it will be achieved that the dispatch articles are seized in all cases by the two pair of belts regardless of their depth. Furthermore, this arrangement of the rollers on both sides of the conveyor belt achieves a spreading out of the two belts at the input side of the switch serving to accept the dispatch articles. Upon swivelling the swinging arms into their operating position there will be effected no change of length regarding the rotating belts.

The present invention will be better understood from reference to the description of an example of an embodiment shown in Figs. 1 to 5 of the accompanying drawings, in which: Figure 1 is a diagrammatic view of the switch of an edgewise conveyor system in perspective.

Figure 1:
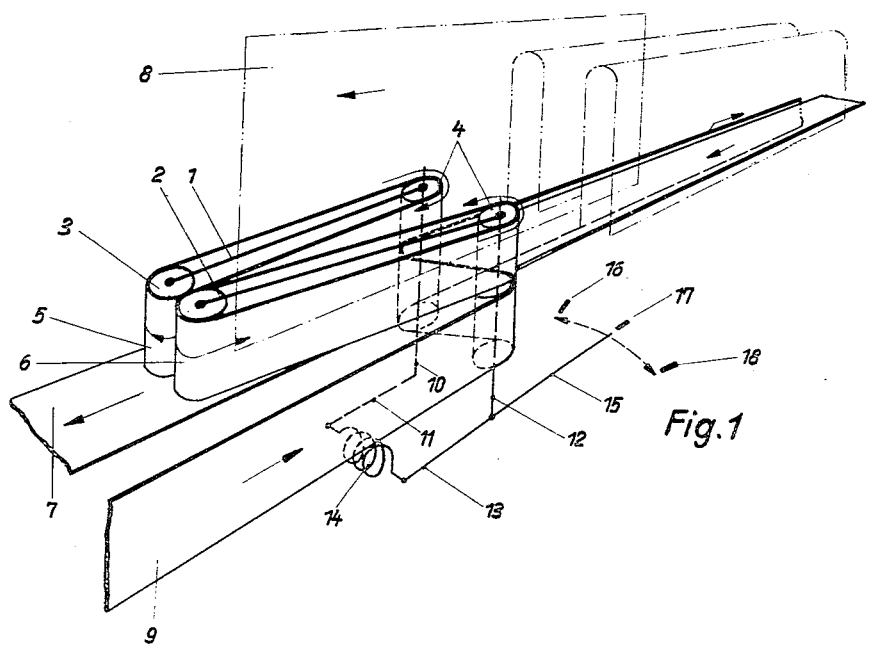

As may be seen from Fig. 1, there are arranged two rollers 4 on opposite sides of the conveyor belt 7 and mounted on the axes 10, 12 which are adjustable in a certain angle of torsion. These axes carry swinging arms 1, 2, at the ends of which there are provided further rollers 3. In their normal poisition the ends of the swinging arms are pointed in the directions of travel of the conveyor belt. Endless rotating belts 5 and 6 are led over the rollers 3 and 4. The driving of the two rotating belts is effected in such a way that the dispatch article 8, when being conveyed, will get into the opening between the swinging arms, which are spread out in their normal position at the input side. In this way the item will be seized by the two rotating belts 5 and 6. For the purpose of driving the two belts, the rollers 4 are prolonged downwards and the return 9 of belt 7 is led via the corresponding belt wrapping thereof. However, it is also possible to drive the two rollers by way of special driving means.

The axes 10, 12 which are adjustable with regard to their angle of torsion, are provided at their lower ends with levers 11, 13 which are connected to each other by means of a tension spring 14. This spring takes care that the two rotating belts are continuously adjacent and permits an elastic lateral yielding of one swinging arm and, therewith an adaptation of the system to different sizes of dispatch articles. One of the levers, e. g. the lever 13, is prolonged in excess of the angle of torsion by means of an arm 15. This arm is required for setting the switch, which may be carried out either manually or electro-magnetically. If this arm 15 is displaced from position 17 into position 16 then the two pairs of belts will perform a swivel motion towards the left-hand side of the belt as seen in the conveying direction. The setting of the arm to point 18 will be followed by a corresponding swivel motion towards the other side. The axes 10, 12 being coupled by means of the tension spring 14 and the levers 11, 13 perform the swivelling motion at the same time. During this swivel motion there will be effected no change of length with regard to the two rotating belts 5 and 6.

In order to clearly point out the direction of movement regarding the conveyor belt and the two belts of the switch corresponding arrows are shown in the drawing.

Figures 2, 3, 4:
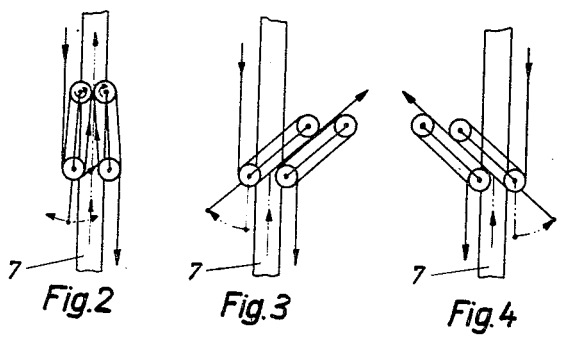
Figure 2 shows the switch being set to a free passage, in a top view.
Figure 3 shows the switch in its launching position toward the right.
Figure 4 shows the switch in its launching position toward the left.

Fig. 2 shows an example of the switch in the unswitched or normal position permitting an uninterrupted passage of an article on the main belt 7. Fig. 3 shows an example of the switch swivelled in the right hand direction and which would cause an article to be dispatched from the main belt from the right hand side thereof. Fig. 4 shows an example of the switch swivelled in the left hand direction and which would cause an article to be dispatched from the main belt from the left hand side thereof. The dispatch article arriving on the conveyor belt 7 in the direction indicated by the arrow gets between the rotating conveyor belts and will be safely transported by them. Also in case the switch is set, the dispatch article will be received by the funnel-shaped switch and will be re-directed by the two belts into the new conveying direction.

Figure 5:
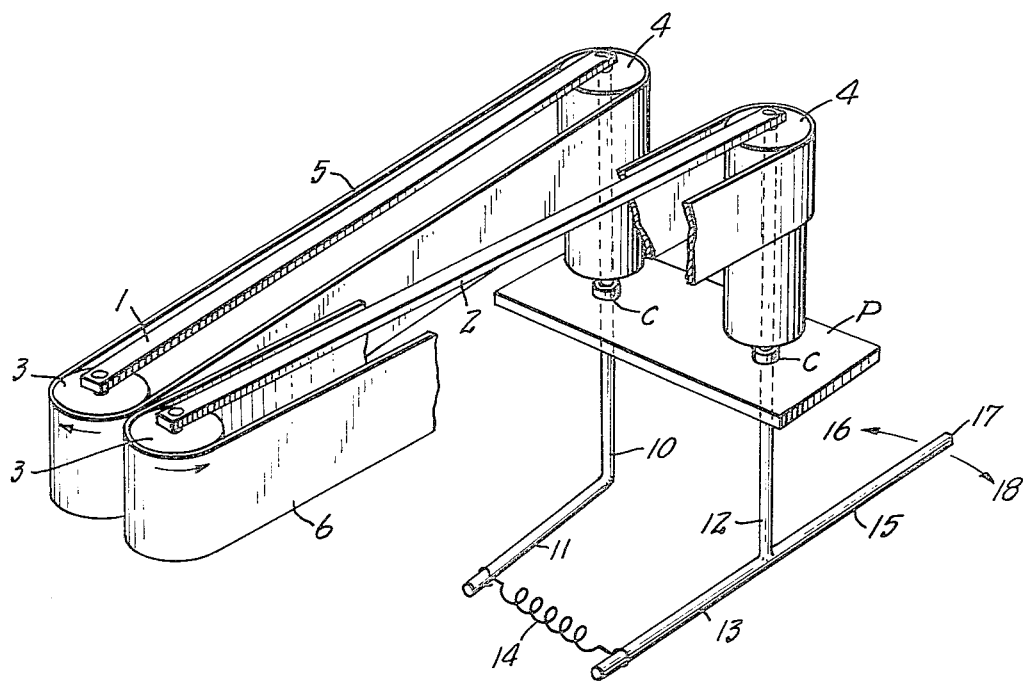
Figure 5 is a perspective view of a portion of the showing of Figure 1 which discloses the details of the construction of the mounting of the switch structure.

Fig. 5 is another perspective view of the switch structure similar to that shown in Fig. 1 but with belt 6 cut away and the main belt 7 and its return run 9 not shown in order that the details of pivotal mounting of the arms 1, 2 may be clearly seen. The axes 10, 12, extend through apertures in a fixed plate P and are held in vertical position by means of a pair of collars C which bear against the top surface of the plate P and enable the axes 10, 12 to be swivelled in the apertures. The main belt 7 passes between the rollers 4 above the plate P.

From the example as described above it may be taken that the guiding of a dispatch article, e. g. into a branching off conveying channel, may be effected without interrupting the action of the forces conveying the dispatch articles.

What is claimed is:

1. A switching arrangement for a conveyor system which conveys flat articles in an edgewise position comprising a main endless conveyor belt adapted to travel in a first direction, a pair of arms substantially parallel to each other and extending in a common plane, said common plane parallel to the plane of said main belt, each arm having a pair of axles extending from opposite ends thereof and at right angles thereto, a plurality of belt rollers, each rotatably mounted on a different one of said axles, means for pivotally mounting corresponding axles at one end of said arms adjacent opposite edges of said main belt, a pair of endless switch belts, each mounted on a pair of rollers associated with said arms, respectively, said switch belts adapted to run edgewise with respect to said main belt, motive means for rotating said switch belts in opposite directions, whereby the facing runs thereof travel in the same direction as said main belt, resilient coupling means for normally coupling said arms in adjacency whereby the facing runs of each of said switch belts are maintained in contiguity along a portion thereof, and means for pivoting in either direction at an angle to the direction of travel of said main belt an axle at said one end of an arm, whereby an article may be diverted from said main belt along either side thereof by said switch belts.

2. A switching arrangement as claimed in claim 1, wherein said mounting means is disposed beneath said main belt.

3. A switching arrangement as claimed in claim 1, wherein said means for pivoting said one axle comprises an extension arm extending normal to said one axle.

4. A switching arrangement as claimed in claim 3, wherein said resilient coupling means comprises a spring extending from said extension to an extension of the corresponding axle associated with the other of said arms whereby said arms are made to pivot in tandem.

5. A switching arrangement as claimed in claim 1, wherein the rollers at said one end of the arms are of a length which extends below the plane of said main belt, the return run of said main belt in operative contact with said rollers in a manner to drive them in reverse directions.

References Cited in the file of this patent
UNITED STATES PATENTS 2,047,106    Lidberg et al.   _____ July 7, 1936

FOREIGN PATENTS 20,361    Great Britain _____ Aug. 26, 1909